United States Patent [19]

Kumar

[11] Patent Number: 5,378,670
[45] Date of Patent: Jan. 3, 1995

[54] PHOSPHORUS ZEOLITES/MOLECULAR SIEVES

[75] Inventor: Ranjit Kumar, Columbia, Md.

[73] Assignee: W. R. Grace & Co.-Conn., New York, N.Y.

[21] Appl. No.: 48,996

[22] Filed: Apr. 16, 1993

[51] Int. Cl.$^6$ .......................... B01J 27/14; B01J 29/06
[52] U.S. Cl. ...................................... 502/60; 502/68; 502/79
[58] Field of Search .............. 502/60, 68, 79; 208/114

[56] References Cited

U.S. PATENT DOCUMENTS

| | | | |
|---|---|---|---|
| 3,354,096 | 11/1967 | Young | 252/435 |
| 4,115,424 | 9/1978 | Unland et al. | 252/432 |
| 4,259,212 | 3/1981 | Gladrow et al. | 252/455 Z |
| 4,340,465 | 7/1982 | Miller et al. | 208/120 |
| 4,357,265 | 11/1982 | Chiang | 208/120 |
| 4,431,517 | 2/1984 | Nevitt et al. | 208/111 |
| 4,454,241 | 6/1984 | Pine et al. | 502/68 |
| 4,465,780 | 8/1984 | Pine | 502/68 |
| 4,483,764 | 11/1984 | Hensley, Jr. et al. | 208/111 |
| 4,498,975 | 2/1985 | Pine et al. | 208/114 |
| 4,504,382 | 3/1985 | Pine | 208/114 |
| 4,567,152 | 1/1986 | Pine | 502/64 |
| 4,584,091 | 4/1986 | Pine | 208/114 |
| 4,765,884 | 8/1988 | Walker et al. | 208/89 |
| 4,839,319 | 6/1989 | Schuette et al. | 502/64 |
| 4,970,183 | 11/1990 | Nakamoto et al. | 502/68 |
| 4,970,185 | 11/1990 | Nakamoto et al. | 502/68 |
| 5,110,776 | 5/1992 | Chitnis et al. | 502/64 |
| 5,173,462 | 12/1992 | Macedo | 502/68 |
| 5,231,064 | 7/1993 | Absil et al. | 502/68 |
| 5,240,890 | 8/1993 | Ino et al. | 208/114 |

FOREIGN PATENT DOCUMENTS

| | | | |
|---|---|---|---|
| 0095364 | 10/1986 | European Pat. Off. | |
| 0252761 | 1/1988 | European Pat. Off. | |
| 0397183 | 11/1990 | European Pat. Off. | |
| 0521554 | 1/1993 | European Pat. Off. | 502/79 |
| 2212219 | 9/1987 | Japan | 502/79 |
| 479485 | 4/1976 | U.S.S.R. | |

*Primary Examiner*—Carl F. Dees
*Attorney, Agent, or Firm*—Steven Capella

[57] ABSTRACT

Catalytically active phosphorus-containing zeolites/molecular sieves, particularly ultrastable zeolite Y, are prepared by reacting an exchanged zeolite/molecular sieve with a phosphorus compound such as $H_3PO_4$, steaming, and reacting the steamed product with additional phosphorus compound.

9 Claims, 3 Drawing Sheets

1000 ppm Ni + 2000 ppm V 1000 ppm Ni + 2000 ppm V

PHOSPHORUS ZEOLITES/MOLECULAR SIEVES

The present invention relates to hydrocarbon conversion catalysts, and more specifically to phorphorus-containing zeolite/molecular sieve catalyst compositions which are active for the catalytic cracking of hydrocarbons.

Crystalline aluminosilicate zeolites, particularly synthetic faujasite, i.e. zeolite Y, have been widely used in the preparation of hydrocarbon conversion catalysts, such as catalytic cracking and hydrocracking catalysts.

Thermally and chemically modified zeolite Y, such as ultrastable zeolite Y (USY) and calcined rare-earth exchanged Y zeolite (CREY), as well as ZSM-5, Beta and SAPO, are included in many commercial hydrocarbon conversion catalysts that are used to convert heavy hydrocarbon feedstocks into more valuable products such as gasoline and diesel fuel.

More recently, catalysts which include phosphorous or phosphorous compounds have been described in U.S. Pat. Nos. 4,498,975, 4,504,382, 4,839,319, 4,970,185, 5,110,776, and EP 0 397 183. These references disclose that the catalytic cracking activity and selectivity of zeolite catalysts may be improved by the addition of phosphorus.

It is an object of the present invention to provide novel phosphorous-containing zeolite/molecular sieve compositions.

It is another object to provide phosphorous-containing zeolites/molecular sieves that may be used to prepare highly active and selective hydrocarbon conversion catalysts.

It is a further object to provide an improved method by which phosphorous modified ultrastable-Y zeolite-containing catalysts may be manufactured and used on a commercial scale.

These and still further objects will become readily apparent to one skilled-in-the-art from the following detailed description, specific examples and drawings.

Figure 1:
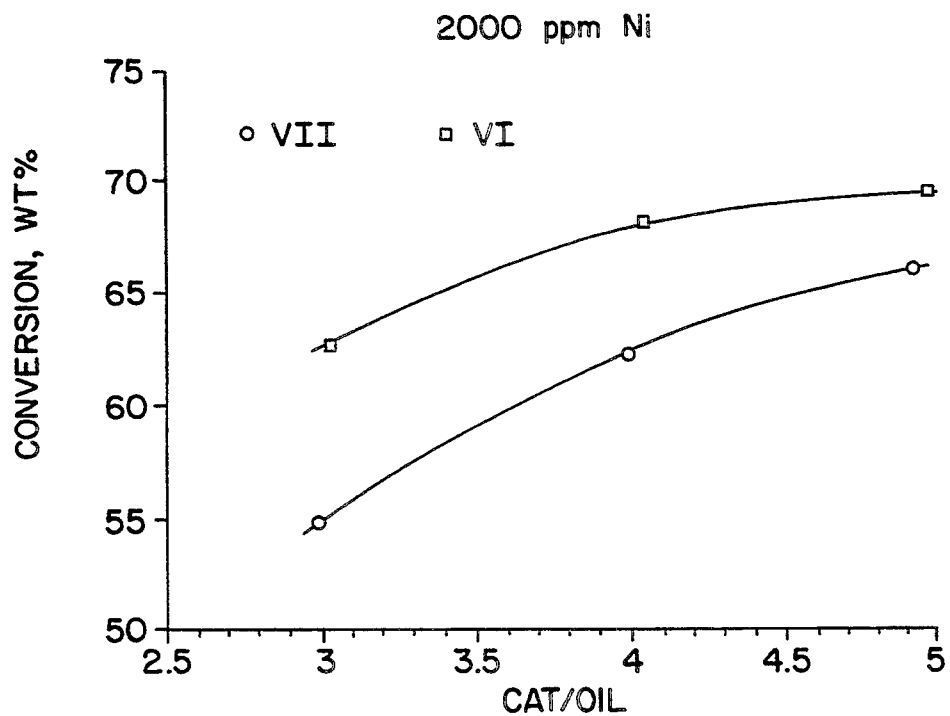
FIGS. 1 to 6 graphically present data which illustrates the catalytic activity and selectivity of catalysts of the present invention.

Broadly, my invention contemplates the preparation of phosphorous modified zeolites/molecular sieves wherein a partially hydrogen, ammonium exchanged sodium zeolite/molecular sieve, is combined with a phosphorus compound, such as $H_3PO_4$ to obtain a phosphorus-containing zeolite/molecular sieve composition that is thermally treated (steamed) to obtain a phosphorus reacted zeolite/molecular sieve that is subsequently reacted with additional phosphorus compounds to obtain a phosphorus treated zeolite/molecular sieve that contains from about 2 to 7 weight percent $P_2O_5$.

More specifically, I have found that catalytically active phosphorus-containing zeolites/molecular sieves, particularly phosphorus/ultrastable Y zeolites may be prepared by the following process:

1) A sodium Y-zeolite (NAY) having a unit cell dimension of about 24.63 to 24.72 Å is ion-exchanged and washed with an ammonium salt solution and water to obtain a partially exchanged Na, H, $NH_4$ Y that contains 1.0 to 5.0, and preferably 2.5 to 4.5, weight percent $Na_2O$.

2) The Na, H, $NH_4$ Y is then combined with an aqueous phosphorus solution such as phosphoric acid at a pH of about 3 to 9, and dried at a temperature of 100° to 350° C., preferably spray dried, to obtain a phosphorus containing Na, H, $NH_4$, Y zeolite (P/Na, H, $NH_4$ Y) that contains about 0.5 to 2.0 and more preferably 0.8 to 1.5 weight percent phosphorus expressed as $P_2O_5$.

3) The P/Na, H, $NH_4$ Y is then heated in the presence of steam (10 to 100%) at a temperature of 500° to 700° C. for 0.5 to 2 hours to obtain a P/USY zeolite having a unit cell of about 24.45 to 24.60 Å and preferably 24.52 to 24.58 Å. At this step the P/USY may be optionally washed/ion exchanged with water/aqueous ammonia sulfate to lower the $Na_2O$ content to below about one weight percent.

4) The P/USY is then reacted with additional aqueous solution of phosphorus compound, preferably $H_3PO_4$, at a temperature of 60° to 100° C. for at least 15 minutes to obtain an aqueous slurry of P/USY/P that contains 2 to 7 weight percent $P_2O_5$.

5) The P/USY/P product may be filtered and dried, or alternatively, in a particularly preferred embodiment the entire P/USY/P-containing slurry may be directly utilized in the preparation of P/USY/P catalyst products.

While the above procedure describes the preparation of "double" phosphorus treated ultrastable Y (P/USY/P), it is contemplated that the procedure may be used to prepare phosphorus treated ZSM-5 (P/ZSM-5/P), Beta (P/Beta/P), mordenite (P/Mordenite/P) and silicoaluminum phosphates (P/SAPO/P).

The P/USY/P zeolite obtained by the above process is particularly active for the catalytic cracking of hydrocarbons when combined with an inorganic oxide matrix such as silica, alumina, silica-alumina sols and gel and clay in accordance with the teaching of U.S. Pat. Nos. 3,650,988, 3,867,308, 3,957,689, CA 967,136 and U.S. Pat. No. 4,458,023. It is also contemplated that the P/USY/P may be exchanged with metal cations such as rare-earths (Ce, La, etc.), as well as Group II, VI and VIII metals such as Ni, Cr and Mg.

The catalyst compositions contemplated herein will contain 10 to 80 weight percent P/USY/P, 3 to 30 weight percent alumina, silica or silica sol/gel binder and the balance clay (preferably kaolin). In addition the catalysts may contain particulate alumina, acid/thermal modified clay, additional zeolites/molecular sieves such as ZSM-5, zeolite Beta, USY, CREY, ALPO and SAPO, as well as combustion/oxidation additives such as Pt and/or Pd, and SOx conversion control sorbents such as $RE/Al_2O_3$, MgO and/or spinel compositions.

The P/USY/P catalytic cracking compositions, when used under FCC reaction/regeneration conditions of 455° to 565° C./575° to 820° C. to crack hydrocarbon feedstocks such as gas oil, residual oil that contains up to about 100 ppm Ni and 200 ppm V and mixtures thereof, are particularly selective for the production of gasoline fractions and the reduction of undesired products such as coke and hydrogen. In addition, the compositions of the present invention find use as catalysts for hydrocracking, isomerization, and hydroprocessing.

Having described the basic aspects of the invention, the following examples are given to illustrate particular embodiments.

EXAMPLE I

Preparation of P/Na, H, NH$_4$Y

NaY having a unit cell dimension of 24.65 Å was ion exchanged with a solution, at 4.5 pH, of ammonium sulfate and sulfuric acid at 75° C. for one hour and washed with water to remove soluble salts. The procedure was repeated.

The filter cake of Na, H, NH$_4$Y was then slurried in water to give 30 percent solids slurry. To this slurry, H$_3$PO$_4$ (20%), under ambient conditions, was added to give 0.9% P$_2$O$_5$ on P/Na, H, NH$_4$Y. The slurry was then spray dried to obtain a product which contained 4 weight percent Na$_2$O, 25 weight percent H$_2$O and a unit cell dimension of 24.70 Å.

EXAMPLE II

Preparation of P/USY

The P/Na, H, NH$_4$Y of Example I was heated at 650° C. in the presence of 100% steam for 2 hours.

The resulting P/USY product contained 0.9 weight percent P$_2$O$_5$ and 4 weight percent Na$_2$O and possessed a unit cell dimension of 24.55 Å.

EXAMPLE III

Preparation of P/USY/P

Part of the P/USY of Example II was reacted with an aqueous solution of H$_3$PO$_4$ (20 weight percent H$_3$PO$_4$) for one hour at a temperature of 90° C. The resulting P/USY/P contained 4 weight percent P$_2$O$_5$, 4 weight percent Na$_2$O and possessed a unit cell dimension of 24.54 Å.

EXAMPLE IV

Preparation of FCC Catalyst from P/USY/P (Invention)

40 weight percent of the P/USY/P, from 30 weight percent solids slurry in H$_2$O, obtained in Example III was combined with 20 weight percent SiO$_2$ (from silica hydrogel) and 40 weight percent kaolin clay. The mixture was spray dried and the resulting catalyst ion exchanged/washed with ammonium sulfate solution/water to reduce the soda level. The catalyst was dried at 100° to 150° C.

EXAMPLE V

Preparation of Comparison Catalyst for P/USY (Prior Art)

40 weight percent of the P/USY, from 30 weight percent solids slurry in H$_2$O, of Example II was combined with 20 weight percent SiO$_2$ (from silica hydrogel) and 40 weight percent kaolin clay. The mixture was spray dried and the resulting catalyst ion exchanged/washed with ammonium sulfate solution/water to reduce the soda level. The catalyst was dried at 100° to 150° C.

The physical and chemical properties of the catalysts of Examples IV and V are summarized in Table I and the catalytic properties in Tables II and III.

TABLE I

| Chemical/Physical Properties | EXAMPLE IV Catalyst Composition (Invention) | EXAMPLE V Catalyst Composition (Prior Art) |
|---|---|---|
| | 40% P/USY/P 20% SiO$_2$ 40% Clay | 40% P/USY/P 20% SiO$_2$ 40% Clay |
| CHEMICALS (wt. %) | | |
| P$_2$O$_5$ | 1.32 | 0.34 |
| Na$_2$O | 0.33 | 0.41 |
| RE$_2$O$_3$ | 0.01 | 0.01 |
| Al$_2$O$_3$ | 26.8 | 27.1 |
| SiO$_2$ | 69.5 | 70.2 |
| SO$_4$ | 0.39 | 0.41 |
| TV @ 1750 | 12.7 | 12.1 |
| PHYSICALS | | |
| Unit Cell (Å) | 24.59 | 24.60 |
| Zeolite SA, m$^2$/g | 275 | 274 |
| Matrix SA, m$^2$/g | 45 | 78 |
| STEAMING PRETREATMENT\* 5 Hrs., 1500 F., 80% Steam 20% Air, 0 psig. | | |
| V ppm | 50 | 50 |
| Ni ppm | 2390 | 2371 |
| Unit Cell (Å) | 24.18 | 24.17 |
| Zeolite SA, m$^2$/g | 76 | 70 |
| Matrix SA, m$^2$/g | 33 | 32 |
| 4 HRS. @ 1500 F., 100% STEAM | | |
| Unit Cell (Å) | 24.24 | 24.24 |
| Zeolite SA, m$^2$/g | 169 | 164 |
| Matrix SA, m$^2$/g | 25 | 31 |

*Catalyst heat treated for 1 hour @ 450° F., then 3 hours @ 1250° F. then impregnated with metal napthanate solution in pentane to give the desired metal level on the catalyst. The catalyst is then heat treated for 1 hour @ 400° F., and then 1 hour @ 1450° F. Finally, the catalyst is steamed for 5 hours @ 1450° F., 80% steam + 20% air, 0 psig.

TABLE II

Catalytic Properties (ASTM D3907-80) after deactivation for 4 hours at 1500° F. 100% steam

| | EXAMPLE IV (Invention) | EXAMPLE V (Prior Art) |
|---|---|---|
| CONVERSION (%) | 63 | 63 |
| Catalyst to Oil Weight Ratio | 3.5 | 3.9 |
| YIELDS (wt. %) | | |
| H$_2$ | 0.035 | 0.055 |
| Dry Gas | 1.5 | 1.7 |
| C$_3$ olefins | 3.9 | 4.5 |
| total C$_3$'s | 4.7 | 5.3 |
| C$_4$ olefins | 4.8 | 5.7 |
| total C$_4$'s | 8.6 | 9.2 |
| C$_5$+Gasoline | 45.8 | 44.5 |
| LCO | 23.4 | 23.4 |
| HCO | 13.6 | 13.6 |
| Coke | 2.2 | 2.2 |
| TOTAL | 99.84 | 99.96 |
| GC RESEARCH OCTANE NUMBER | 89.0 | 90.7 |
| GC MOTOR OCTANE NUMBER | 79.7 | 80.2 |

TABLE III

Evaluation of Catalysts after Metal Deactivation* with 2000 ppm Ni

| | EXAMPLE IV (Invention) | EXAMPLE V (Prior Art) |
|---|---|---|
| CONVERSION (%) | 58 | 58 |
| Catalyst to Oil Weight Ratio | 3.8 | 4.8 |
| YIELDS (wt. %) | | |
| H$_2$ | 0.425 | 0.510 |

TABLE III-continued

Evaluation of Catalysts after Metal Deactivation*
with 2000 ppm Ni

|  | EXAMPLE IV (Invention) | EXAMPLE V (Prior Art) |
|---|---|---|
| Dry Gas | 1.40 | 1.55 |
| C$_3$ olefins | 3.2 | 3.4 |
| total C$_3$'s | 3.8 | 4.0 |
| C$_4$ olefins | 4.4 | 4.7 |
| total C$_4$'s | 6.6 | 7.1 |
| C$_5$+Gasoline | 41.2 | 39.5 |
| LCO | 18.0 | 18.0 |
| HCO | 24.0 | 24.0 |
| Coke | 4.5 | 5.4 |
| TOTAL | 99.93 | 100.06 |
| GC RESEARCH OCTANE NUMBER | 90.3 | 91.1 |
| GC MOTOR OCTANE NUMBER | 79.6 | 79.8 |

*Catalyst heat treated for 1 hour @ 450° F., then 3 hours @ 1250° F. then impregnated with metal napthanate solution in pentane to give the desired metal level on the catalyst. The catalyst is then heat treated for 1 hour @ 400° F., and then 1 hour @ 1450° F. Finally, the catalyst is steamed for 5 hours @ 1500° F., 80% steam + 20% air, 0 psig.

EXAMPLE VI

Additional Catalyst Sample (Invention)

A catalyst was prepared by mixing 35 weight percent P/USY/P of Example III (from 30 weight percent solids slurry in H$_2$O), 20 weight percent SiO$_2$ (from silica hydrogel), 10 weight percent Al$_2$O$_3$ (from 30 weight percent solids slurry in H$_2$O) and 35% kaolin clay.

The mixture was spray dried and the resultant catalyst was ion exchanged/washed with ammonium sulfate solution/water to reduce the soda level. Then the catalyst was ion exchanged/washed with rare earths chloride solution/water. Finally the catalyst was dried at 100° to 150° C.

EXAMPLE VII

Additional Catalyst Sample (Prior Art)

A catalyst was prepared by as set forth in Example VI except that the P/USY/P of Example III was replaced with P/USY of Example II.

The physical/chemical properties of the catalysts of Examples VI and VII are summarized in Tables IV and V.

EXAMPLE VIII

Catalytic Evaluation of the Catalysts of Examples VI and VII

Samples of the catalysts of Examples VI and VII were subjected to the following pretreatment procedures:

(a) Deactivation in the presence of Ni (Figures 1–3) —The catalyst was heat treated for one hour at 450° F., then 3 hours at 1250° F., then impregnated with metal napthanate solution in pentane to give the desired metal level on the catalyst. The catalyst was then heat treated for one hour at 400° F., and then one hour at 1450° F. Finally, the catalyst was steamed for 5 hours at 1500° F., 80 percent steam plus 20 percent air, 0 psig.

(b) Deactivation in the presence of Ni+V (FIGS. 4–6)—This is the same as in the presence of Ni, except during the steam deactivation the temperature was 1450° F. instead of 1500° F.

Figure 2:
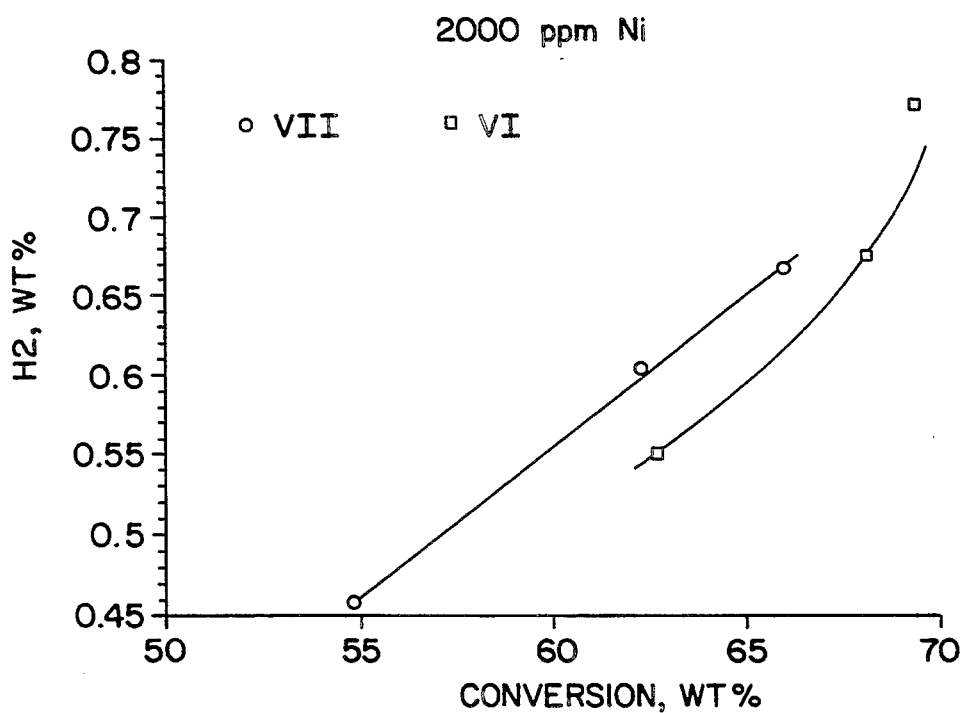
Figure 3:
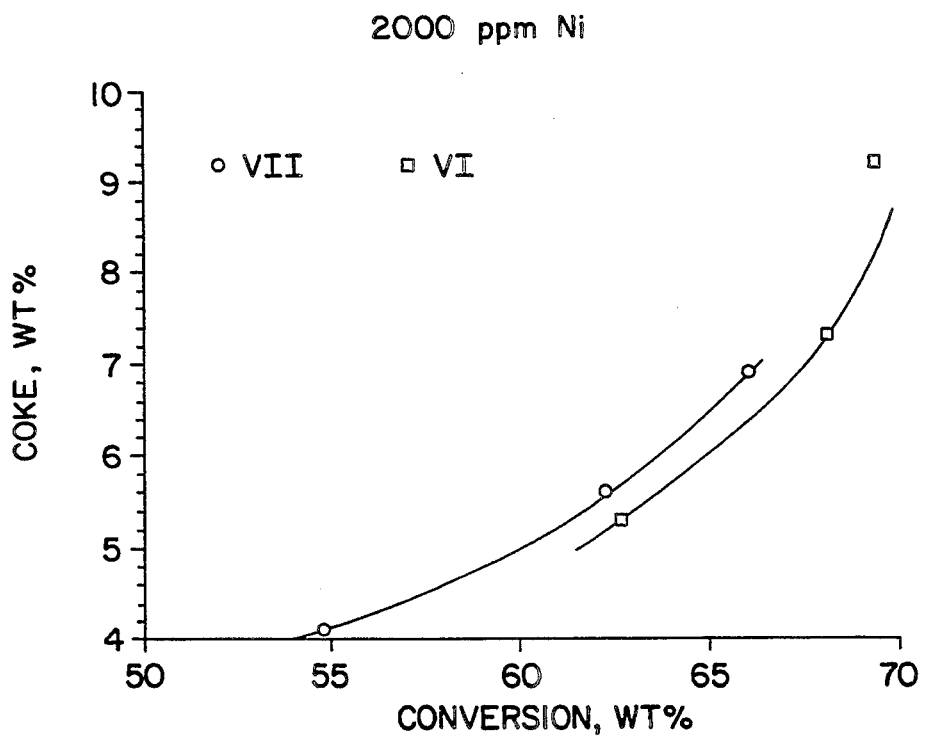

In the presence of Ni only, it is clear from the FIGS. 1–3 that the catalyst according to the invention is more active and makes less undesirable products like H$_2$ and coke.

Figure 4:
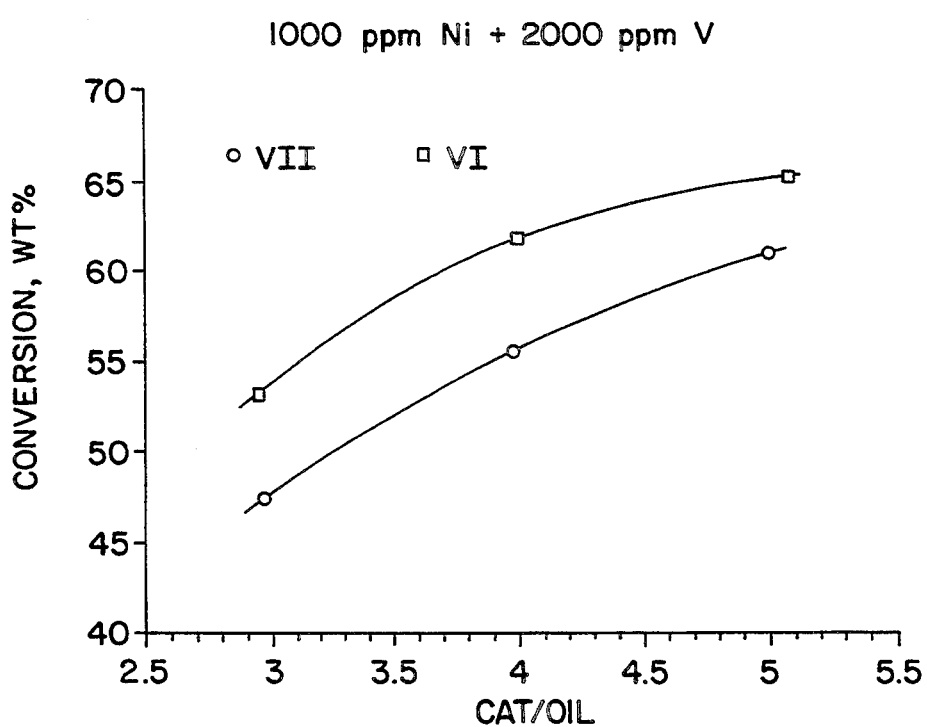
Figure 5:
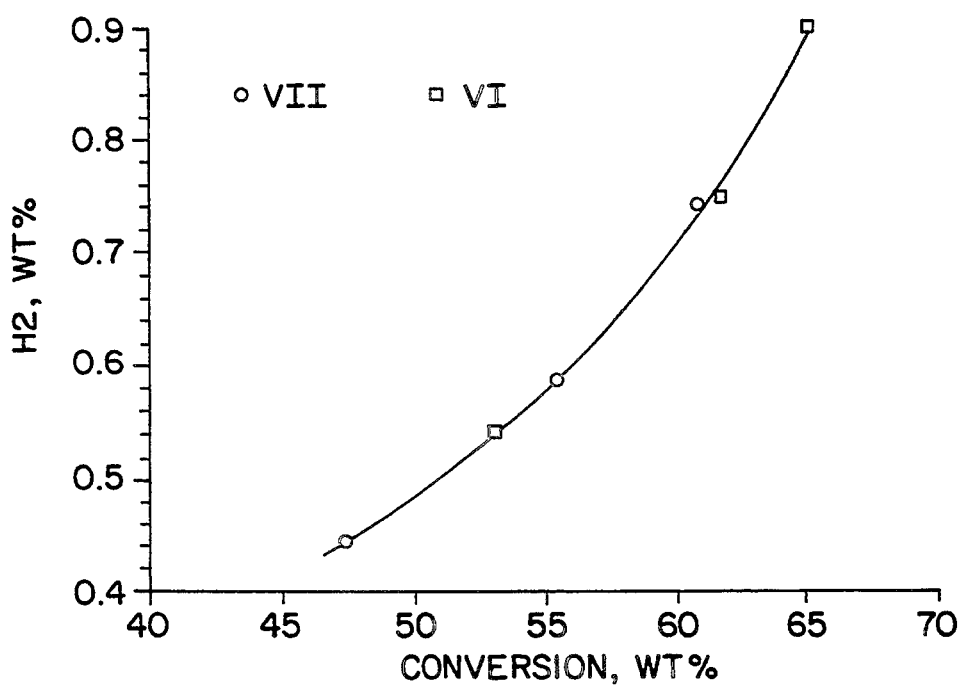
Figure 6:
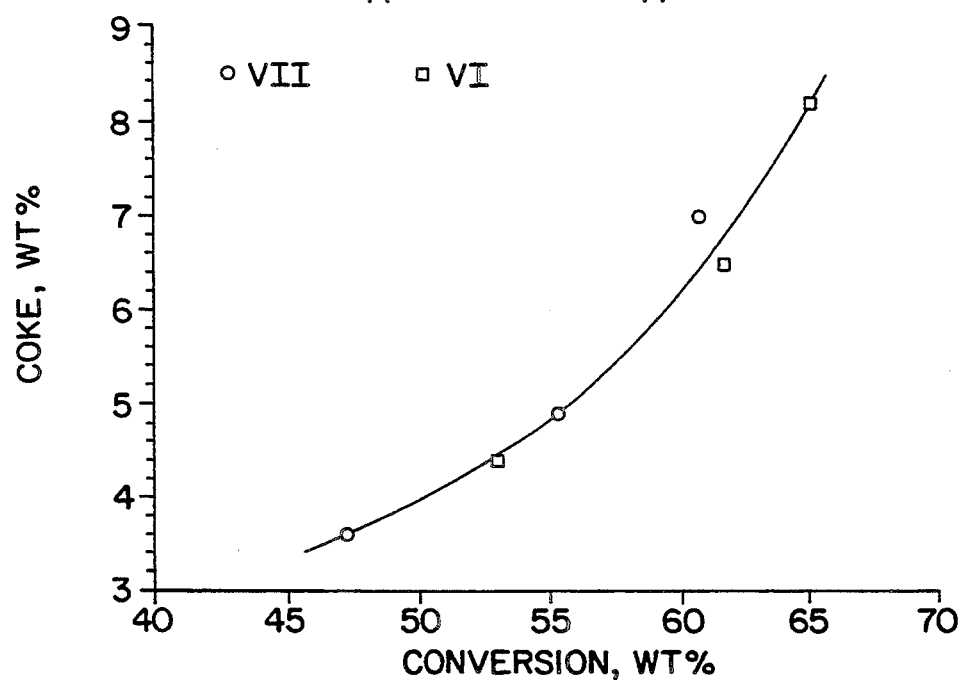

In the presence of Ni+V, it is clear from the FIGS. 4–6, that the catalyst according to the invention is more active, but makes the same amount of H$_2$ and coke.

TABLE IV

|  | EXAMPLE VI Catalyst Composition (Invention) | EXAMPLE VII Catalyst Composition (Prior Art) |
|---|---|---|
|  | 35 wt. % P/USY/P 10 wt. % Al$_2$O$_3$ 35 wt. % Clay 20 wt. % SiO$_2$ | 35 wt. % P/USY 10 wt. % Al$_2$O$_3$ 35 wt. % Clay 20 wt. % SiO$_2$ |
| CHEMICAL ANALYSIS (wt. %) |  |  |
| RE$_2$O$_3$ | 2.49 | 2.53 |
| P$_2$O$_5$ | 1.17 | 0.28 |
| Na$_2$O | 0.14 | 0.17 |
| Al$_2$O$_3$ | 32.8 | 32.4 |
| SiO$_2$ | 61.5 | 62.8 |
| SO$_4$ | 0.46 | 0.28 |
| TV @ 1750 | 12.5 | 12.9 |
| PHYSICAL PROPERTIES |  |  |
| ABD (g/cc) | 0.68 | 0.72 |
| Davison Index | 2 | 0 |
| Unit cell (Å) | 24.60 | 24.60 |
| Zeolite SA, m$^2$/g | 251 | 249 |
| Matrix SA, m$^2$/g | 42 | 63 |

TABLE V

|  | EXAMPLE VI Catalyst Composition (Invention) | EXAMPLE VII Catalyst Composition (Prior Art) |
|---|---|---|
|  | 35 wt. % P/USY/P 10 wt. % Al$_2$O$_3$ 35 wt. % Clay 20 wt. % SiO$_2$ | 35 wt. % P/USY 10 wt. % Al$_2$O$_3$ 35 wt. % Clay 20 wt. % SiO$_2$ |
| PROPERTIES |  |  |
| (1) After Pretreatment with 2000 ppm Ni as shown in Example VIII(a) |  |  |
| Unit Cell (Å) | 24.26 | 24.24 |
| Zeolite SA, m$^2$/g | 118 | 96 |
| Matrix SA, m$^2$/g | 39 | 40 |
| Ni ppm | 1998 | 2155 |
| (2) After Pretreatment with 0.30 wt. % Ni + V as shown in Example VIII (b) |  |  |
| Unit Cell (Å) | 24.23 | 24.23 |
| Zeolite SA, m$^2$/g | 92 | 76 |
| Matrix SA, m$^2$/g | 30 | 33 |
| Ni ppm | 985 | 1015 |
| V ppm | 2050 | 2090 |

The data set forth in the Examples, Tables and Figures clearly indicate that valuable FCC catalysts may be obtained using the teachings of my invention.

I claim:

1. A method for preparing a phosphorus-containing zeolite/molecular sieve comprising:
   (a) ion exchanging and washing a sodium zeolite/molecular sieve to obtain a zeolite/molecular sieve having a Na$_2$O content of 1 to 5 weight percent;
   (b) treating the product of step (a) with an aqueous solution of a phosphorus compound to obtain a phosphorus containing zeolite/molecular sieve having a phosphorus content of from about 0.5 to 1.5 weight percent expressed as $P_2O_5$ (c) heating the product of step (b) with stream; and (d) reacting the product of step (c) with additional phosphorus compound to obtain a product having a $P_2O_5$ content of 2 to 7 weight percent.

2. The method of claim 1 wherein the zeolite is zeolite Y and the heating step (c) reduces the unit cell to about 24.50 to 24.58 Å.

3. The method of claim 1 wherein the zeolite/molecular sieve is selected from the group consisting of Type X, Type Y, ZSM-5, Beta and SAPO.

4. The method of claim 1 wherein the phosphorus compound is selected from the group consisting of $H_3PO_4$, $(NH_4)_2 HPO_4$, $NH_4 H_2 PO_4$, $Na H_2 PO_4$, and mixtures thereof.

5. The method of claim 1 wherein the product at step (c) is heated at a temperature of 500° to 750° C. in the presence of 10 to 100 percent steam.

6. The method of claim 1 wherein the product of step (c) is washed/ion exchanged to remove sodium ions.

7. A composition prepared by the method of claim 1.

8. The composition of claim 7 having a phosphorus content of 0.3 to 4 weight percent expressed as $P_2O_5$.

9. A catalyst comprising the composition of claim 7 dispersed in an inorganic oxide matrix.

* * * * *